United States Patent
Park

(10) Patent No.: US 6,386,309 B1
(45) Date of Patent: May 14, 2002

(54) MOUNT ASSEMBLY FOR AUTOMOTIVE POWER PLANT

(75) Inventor: Ki-Taek Park, Ulsan (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 09/466,021

(22) Filed: Dec. 17, 1999

(30) Foreign Application Priority Data

Mar. 22, 1999 (KR) .......................................... 99-9624

(51) Int. Cl.[7] ................................................ B60K 1/00
(52) U.S. Cl. ..................................... 180/300; 180/291
(58) Field of Search ................................ 180/300, 297, 180/291; 267/293, 292, 141.2, 140.12; 248/238, 675, 677, 611, 635, 659; 403/228; 123/192

(56) References Cited

U.S. PATENT DOCUMENTS

| | | | | |
|---|---|---|---|---|
| 3,694,895 A | * | 10/1972 | Werner | 29/469 |
| 4,157,227 A | * | 6/1979 | Hahle | 403/228 |
| 4,667,764 A | * | 5/1987 | Sawada et al. | 180/297 |
| 5,074,374 A | * | 12/1991 | Ohtake et al. | 180/312 |
| 5,129,479 A | * | 7/1992 | Fujii et al. | 180/297 |
| 5,295,653 A | * | 3/1994 | Miyazaki et al. | 248/675 |
| 6,105,548 A | * | 8/2000 | Carlson et al. | 123/195 A |
| 6,155,372 A | * | 12/2000 | Hirasaka | 180/297 |
| 6,270,051 B1 | * | 8/2001 | Power | 248/638 |

FOREIGN PATENT DOCUMENTS

| | | |
|---|---|---|
| JP | 060-16171 | 1/1994 |
| JP | 10-299833 | 11/1998 |

* cited by examiner

*Primary Examiner*—Brian L. Johnson
*Assistant Examiner*—Gerald Klebe
(74) *Attorney, Agent, or Firm*—Christie, Parker & Hale, LLP

(57) ABSTRACT

A power plant mounting structure for a vehicle including an engine-side mount assembly, a transmission-side mount assembly, and front and rear mount assemblies, wherein the engine-side mount assembly includes a mount which is less stiff in the front and rear directions than in the upward and downward directions of the vehicle, and is arranged such that an axis of the mount is parallel to an inertial axis of a moment of inertia of the power plant. Furthermore, it also includes a linkage member for connecting the mount to an engine-side of the power plant by coupling a screw member coaxially fixed at the center of the mount with a screw block fixed to the engine-side of the power plant, and a mounting bracket for fixing the mount to a side member of vehicle body.

3 Claims, 8 Drawing Sheets

FIG.10
_PRIOR ART_
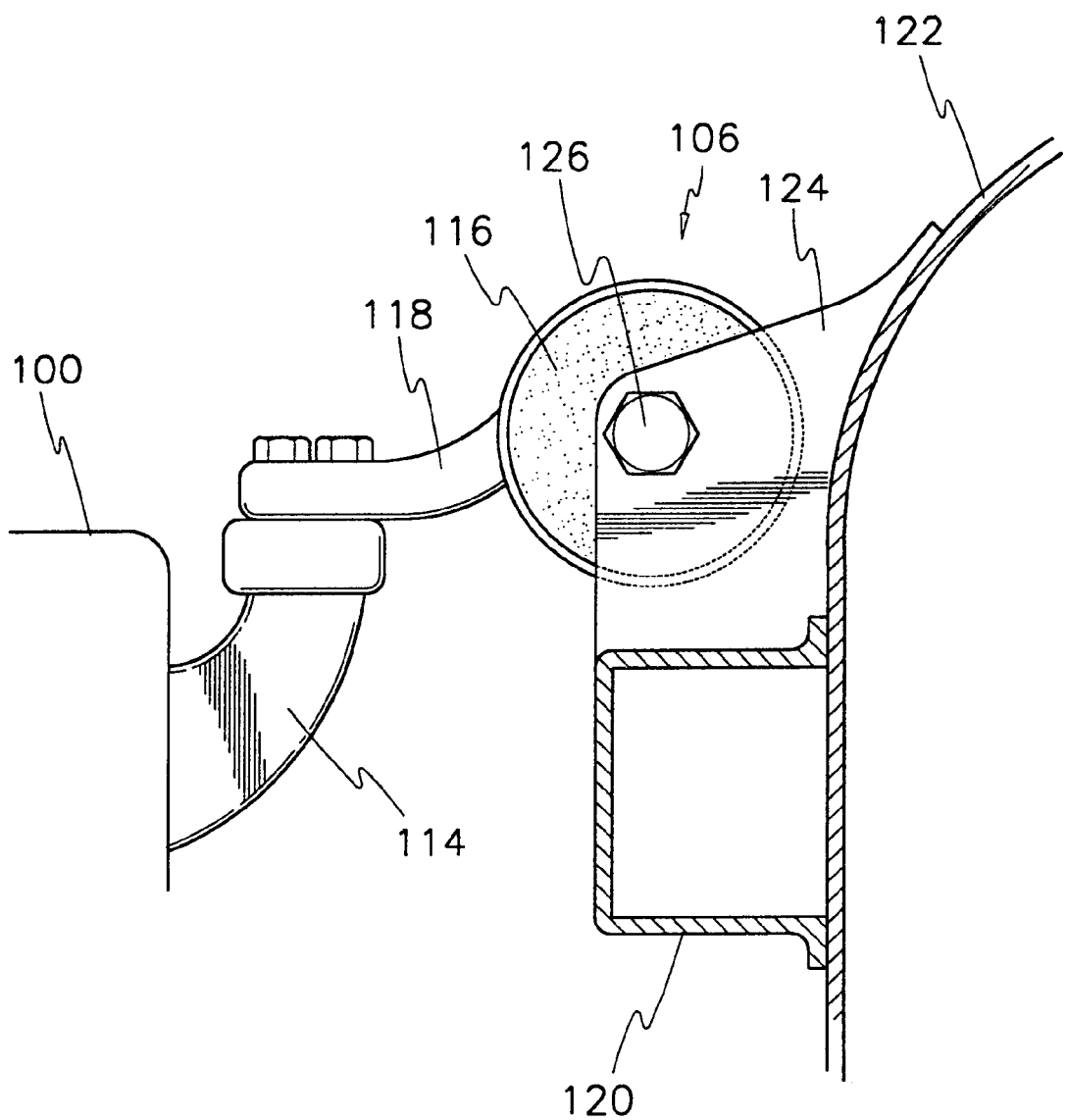

MOUNT ASSEMBLY FOR AUTOMOTIVE POWER PLANT

BACKGROUND OF THE INVENTION

1. Field of the Invention

The present invention relates to a mount assembly for an automotive power plant, and, more particularly, to an improved mount assembly capable of preventing rocking of the power plant and also of preventing engine and transmission vibrations from being transmitted to a vehicle body so as to enhance the ride comfort of a vehicle.

2. Description of the Related Art

Typically, an automotive power plant having an engine and a transmission is mounted transversely in a vehicle. When mounting the power plant on the vehicle body, a plurality of mounts are used for preventing rocking of the power plant and preventing the engine and transmission vibrations from being transmitted to the vehicle body.

FIG. 9 shows a power plant mounted on a vehicle by employing a plurality of mounts. A power plant 104 comprises an engine 100 and transmission 102 arranged transversely in a vehicle and is fixed to the vehicle body by first, second, third, and fourth mounts 106, 108, 110, and 112. The mounts 106, 108, 110, and 112 are respectively located in four directions around the power plant. That is, the first mount 106 is positioned in the vicinity of the engine-side end of the power plant and the second mount 108 is positioned in the vicinity of the transmission-side end of the power plant. The third and the fourth mounts 110 and 112 are respectively mounted in the vicinity of power plant's vehicle-front end and vehicle-rear end.

The first mount 106 connects the engine-side of the power plant 104 and the vehicle body by fixing one end of a mounting bracket 118 (the other end of the mounting bracket 118 being connected as shown in FIG. 10 by means of bolt to one end of an engine support bracket 114 which is fixed and supports the engine 100) and by being connected to a mounting bracket 124 fixed to the vehicle body which is supported on a front apron 122 and a side member 120 that are provided on the inner surface of the vehicle body. The first mount 106 is inserted in the mounting bracket 124 and fixed thereon by means of bolt 126 to which penetrates openings formed at the center of the first mount 106 and the mounting bracket 124 and a nut 128 (see FIG. 9).

However, since the first mount 106 is connected to the mounting bracket 124 such that the axial bore through which the bolt 126 passes is oriented along the longitudinal direction of the vehicle body, the rigidity of the mounting bracket 124 in the longitudinal direction of the vehicle is deteriorated. Accordingly, the first mount can not efficiently prevent rocking of the power plant especially when the vehicle is abruptly accelerated and it also can not prevent the engine and transmission vibrations from being transmitted to the vehicle body. This results in a deterioration of the ride comfort of the vehicle.

SUMMARY OF THE INVENTION

The present invention has been made in an effort to solve the above problems of the prior art.

It is an object of the present invention to provide a mount for an automotive power plant capable of preventing rocking of the power plant and also of preventing the engine and transmission vibrations from being transmitted to the vehicle body by effectively absorbing vibrations of the power plant so as to improve the ride comfort of the vehicle.

To achieve the above object, in a power plant mounting structure for vehicle including an engine side mount assembly, a transmission side mount assembly, and front and rear mount assemblies, the engine-side mount assembly comprises a mount which is less stiff in front and rear directions than in the upward and downward directions of the vehicle, and is arranged such that an axis of the mount is parallel to an inertial axis of a moment of inertia of the power plant. Furthermore, it also comprises a linkage member for connecting the mount to an engine-side of the power plant by coupling a screw member coaxially fixed at the center of the mount with a screw block fixed to the engine-side of the power plant, and a mounting bracket for fixing the mount to a side member of the vehicle body.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 10 is an enlarged side view of the conventional engine side mount assembly of FIG. 9.

DETAILED DESCRIPTION OF THE PREFERRED EMBODIMENTS

A preferred embodiment of the present invention will be described hereinafter with reference to the accompanying drawings.

Figure 1:
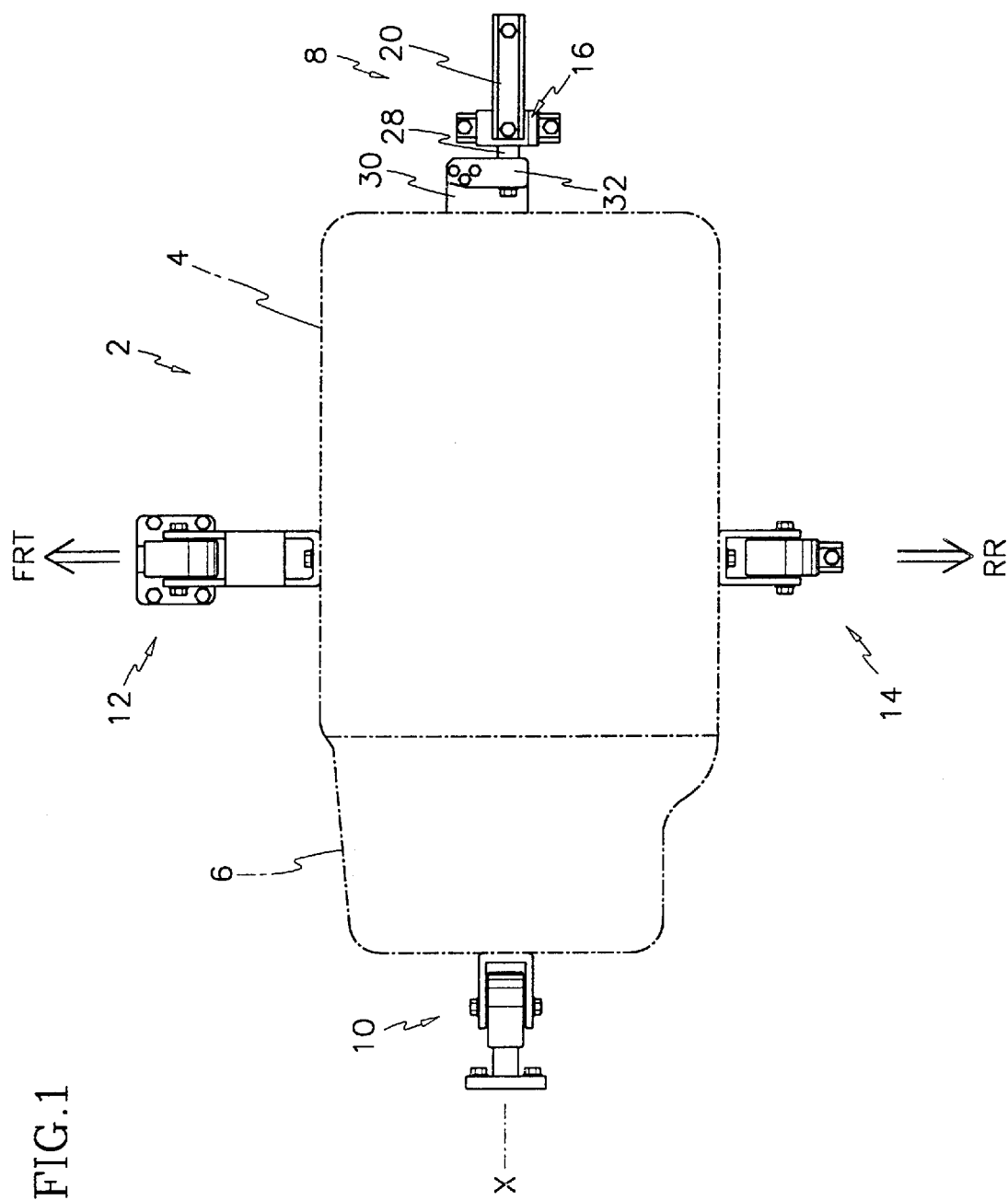
FIG. 1 is a top plan view showing mount assemblies adapted for mounting a power plant according to a preferred embodiment of the present invention.

FIG. 1 is a top plane view showing mount assemblies adapted for mounting a power plant according to a preferred embodiment of the present invention.

In FIG. 1, reference numeral 2 denotes the power plant, which is an engine and transmission assembly. The power plant 2 is arranged transversely in a vehicle and fixed to the vehicle body by first, second, third, and fourth mount assemblies 8, 10, 12, and 14. The mount assemblies 8, 10, 12, and 14 are respectively located in four directions around the power plant 2. That is, the first mount assembly 8 is positioned in the vicinity of the engine-side of the power plant 2 and the second mount assembly 10 is positioned in the vicinity of the transmission-side of the power plant 2. The third and the fourth mount assemblies 12 and 14 are respectively positioned in the vicinities of power plant 2 in the front and rear directions of the vehicle.

Figure 2:
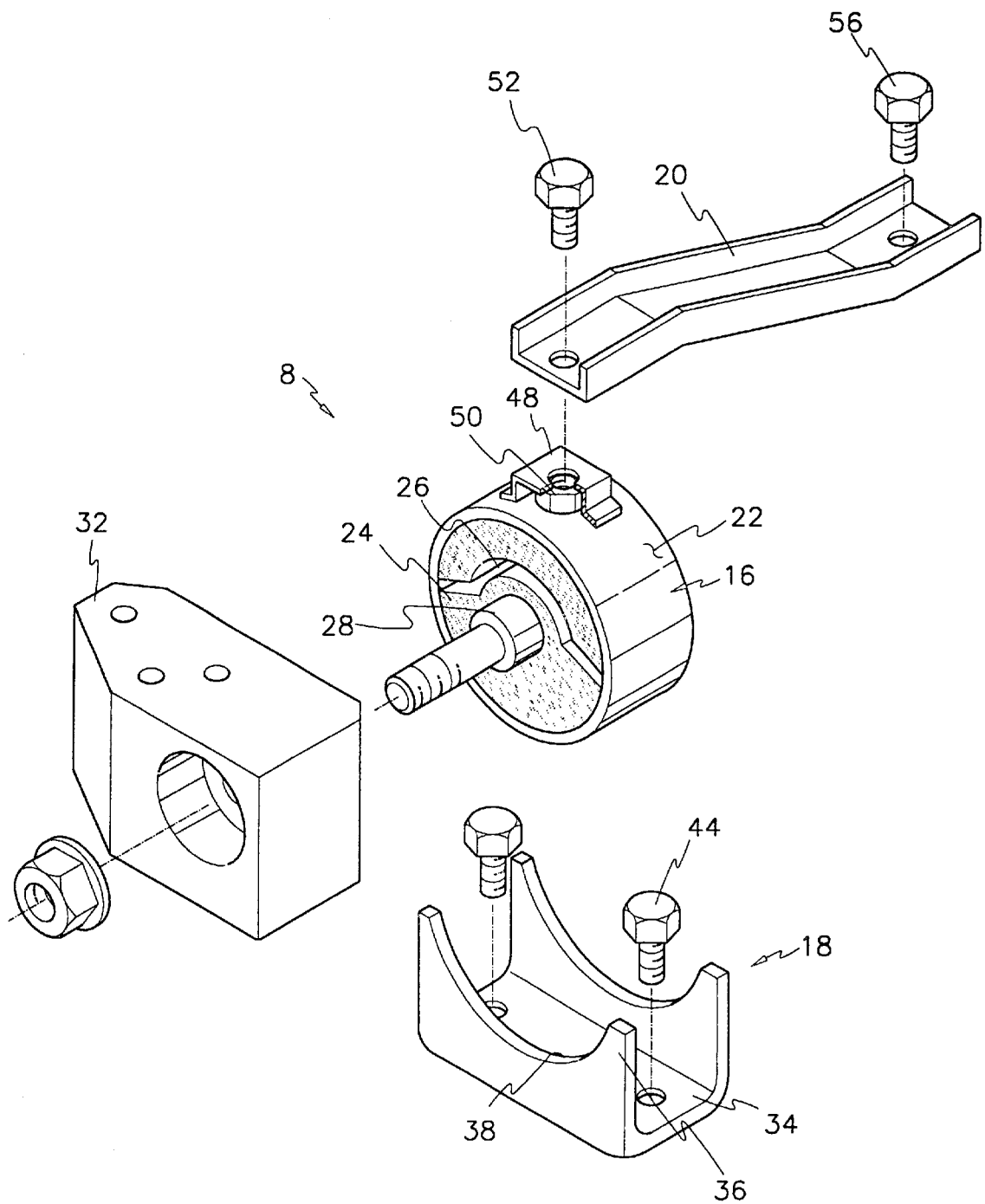
FIG. 2 is a dissembled oblique view of an engine side mount assembly of FIG. 1.

As shown in FIG. 2, the first mount assembly 8 includes a first mount 16, a linkage means for connecting the mount 16 to an engine-side end of the power plant 2, a mounting bracket 18 for connecting the first mount 16 to a vehicle body, and stay 20. The first mount 16 includes a cylindrical outer member 22 having a predetermined inner diameter and an elastic member 24 that fills up an inner space of the cylindrical outer member 22. Typically, the elastic member 24 consists of a rubber material having a crevice 26, which separates the elastic member 24 into an upper and a lower part, such that the elastic member 24 is less stiff in a longitudinal direction than in a vertical direction of the vehicle.

The way of making the elastic material to be less stiff in the front and rear directions than in the upward and downward directions of the vehicle is not limited to the above disclosed configuration, but also covers various modifications and equivalent arrangements.

The linkage member for connecting the mount 16 to the engine-side of the power plant 2 includes a screw member 28 fixedly inserted into a central bore of the elastic member 24 and a screw block 32 fixed at the engine support bracket 30 by means of bolts. The screw block 32 is provided with a counterbore opening, such that a nut is secured in the counterbored opening and screwed onto the threaded end of the screw member 28. Thus, the screw member 28 is arranged such that the axis of the screw member 28 is parallel to an inertial axis X of a moment of inertia of the power plant 2, which closely corresponds to the axis of rotation of the engine drive shaft (refer to FIG. 1).

Figure 3:
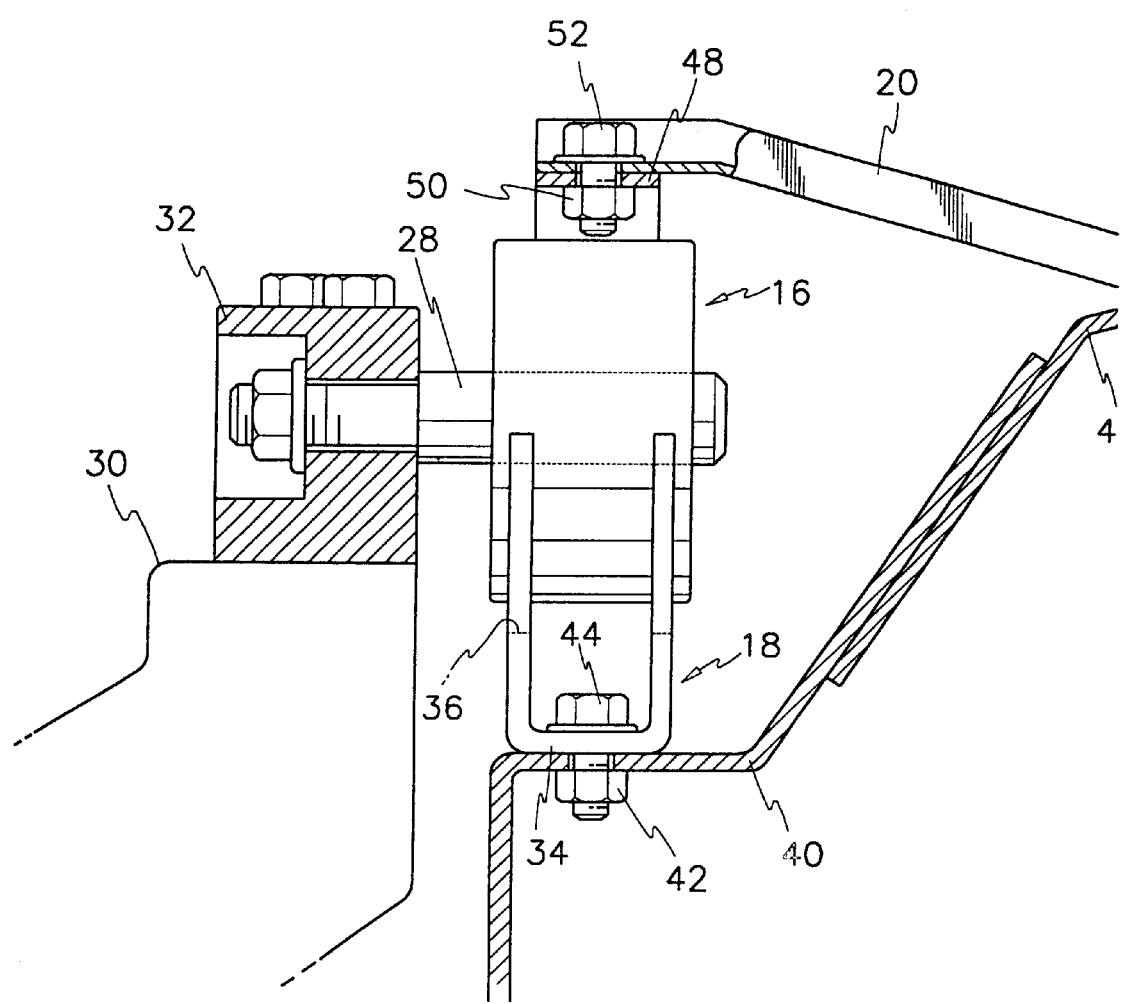
FIG. 3 is an assembled front view of the engine side mount assembly of FIG. 2.
Figure 4:
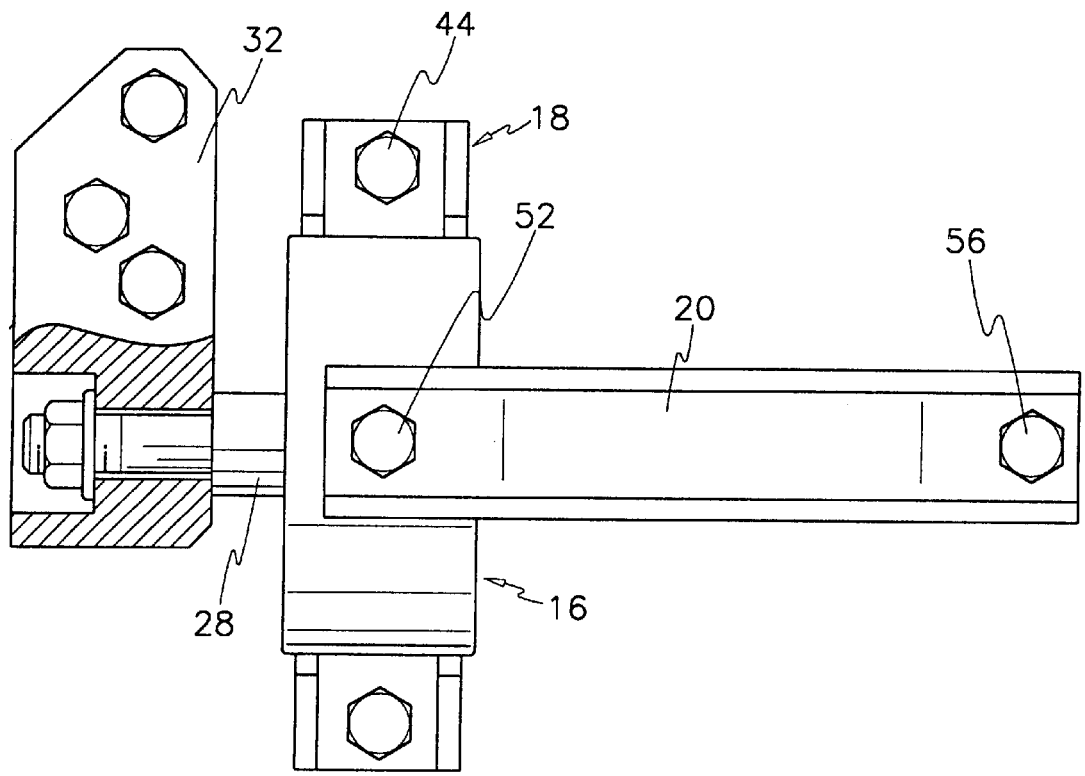
FIG. 4 is an enlarged top plane view of FIG. 3.
Figure 5:
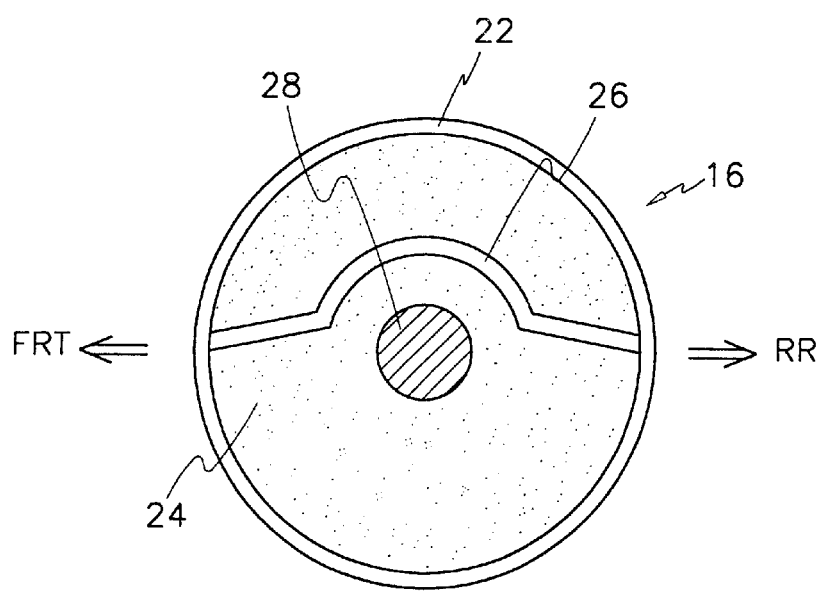
FIG. 5 is a cross-sectional view of an engine side mount assembly.

The mounting bracket 18 for fixing the first mount 16 to the vehicle body includes a fixing part 34 which contacts the side member 40 of the vehicle body and a pair of vertical supports 36 that are perpendicularly extended upward from the fixing part 34 (refer to FIG. 3). Each vertical support 36 is formed having a concave curvature part 38 such that the first mount 16 is loaded on the concave curvature part 38 of the vertical supports 36 and fixed by means such as welding or the like.

The fixing part 34 of the mounting bracket 18 has one or more bores such that after the mounting bracket 18 is mounted on the side member 40 which also has corresponding bores to the bores on the fixing part 34, bolts 44 are inserted through the overlapped bores and then are secured by screwing nuts 42 onto the end portions of the bolts on the opposite side of the side member 40.

To enhance the rigidity of the mounting structure, a stay 20, which is formed by perpendicularly bending both the longer edges of a steel strip into a channel-like part of predetermined width (see FIG. 2), bridges over the first mount 16 and an apron panel 46 of the vehicle and is fixed thereon at both its ends.

For connecting one end of the stay 20 to the mount 16, a fixture 48 is formed at the top portion of the outer member 22 of the mount 16 and a nut 50 is secured inside of the fixture 48 such that one end of the stay 20 is fixed on the fixture 48 by mounting the end of the stay 20 having a corresponding bore on the fixture 48, inserting a first bolt 52 through the overlapped bores, and screwing into the nut 50. Also, the other end of the stay 20 is connected to the apron panel 46 of the vehicle body by mounting the end of the stay 20 on the apron 46 having a corresponding bore to the bore formed on the other end of the stay 20, inserting therethrough a second bolt 56, and screwing a nut onto the end portion of the bolt 56. Accordingly, the engine-side first mount assembly 8 is able to reinforce stiffness in the transverse direction of the vehicle. Since the first mount 16 of the mount assembly 8 is formed so that the axis of the mount 16 is parallel to the inertial axis X of the moment of inertia of the power plant 2, and the elastic member 24 of the first mount 16 is formed so as to be less stiff in front and rear directions of the vehicle than in upward and downward directions, the first mount 16 can effectively prevent rocking of the power plant especially when the vehicle is abruptly accelerated or decelerated as well as prevent the engine vibration and noise from being transmitted to the passenger compartment.

Figure 6:
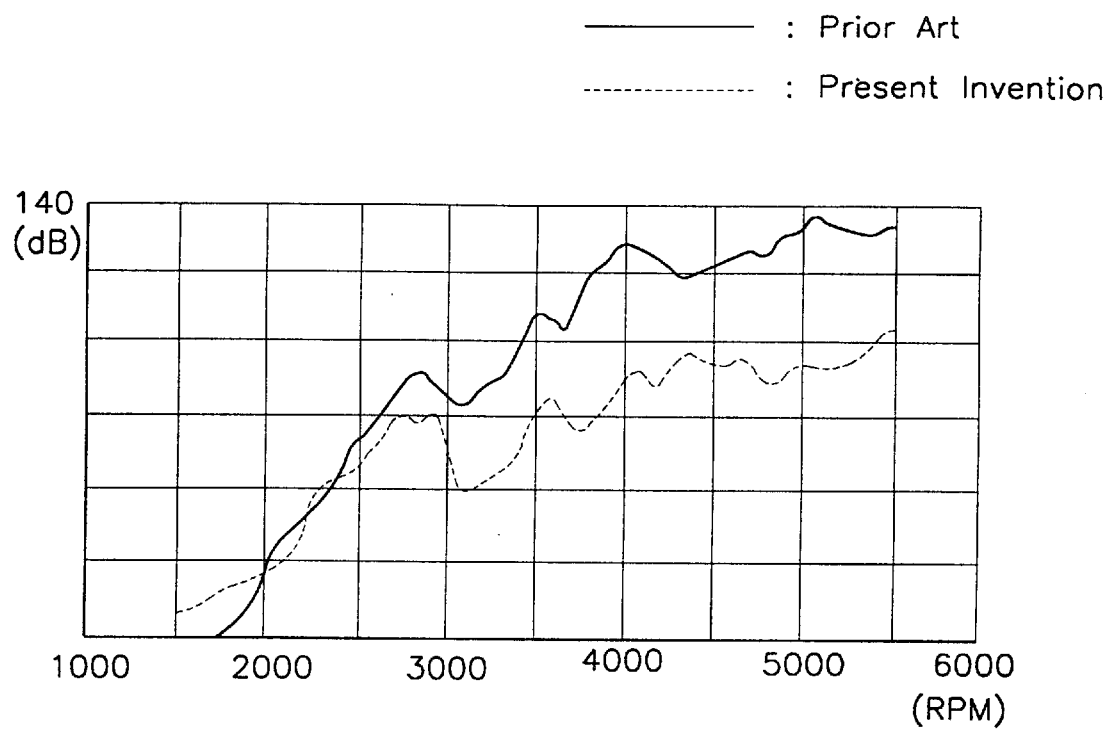
FIG. 6 is a graph comparably showing the vibration levels of a power plant versus engine RPM when the engine employs a conventional mount assembly and when the engine employs a mount assembly of the present invention.

FIG. 6 is a graph showing a comparison of vibration levels at the vicinity of the mounting bracket 18 when respectively employing a mount according to the preferred embodiment of the present invention and a mount according to prior art.

As shown in FIG. 6, when the mount of the present invention was applied, the vibration reduction efficiency was improved at engine speeds of over 2400 revolutions per minute (RPM).

Figure 7:
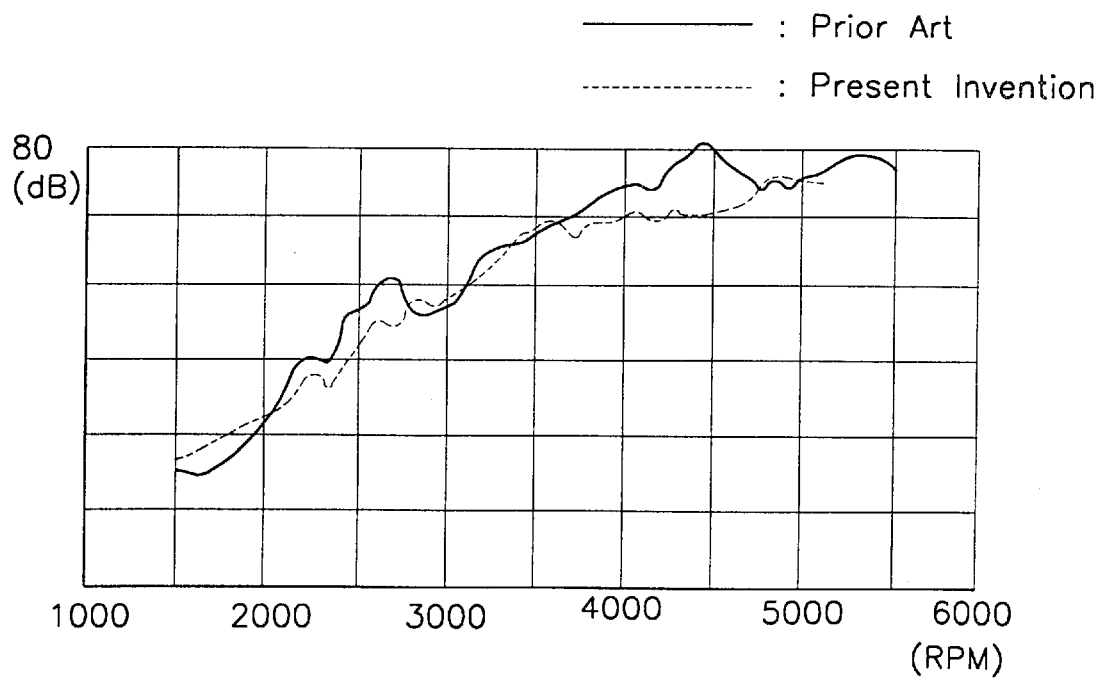
FIG. 7 is a graph comparably showing the noise levels in a front seat of a vehicle for a power plant versus engine RPM when the engine employs a conventional mount assembly and when the engine employs a mount assembly of the present invention.
Figure 8:
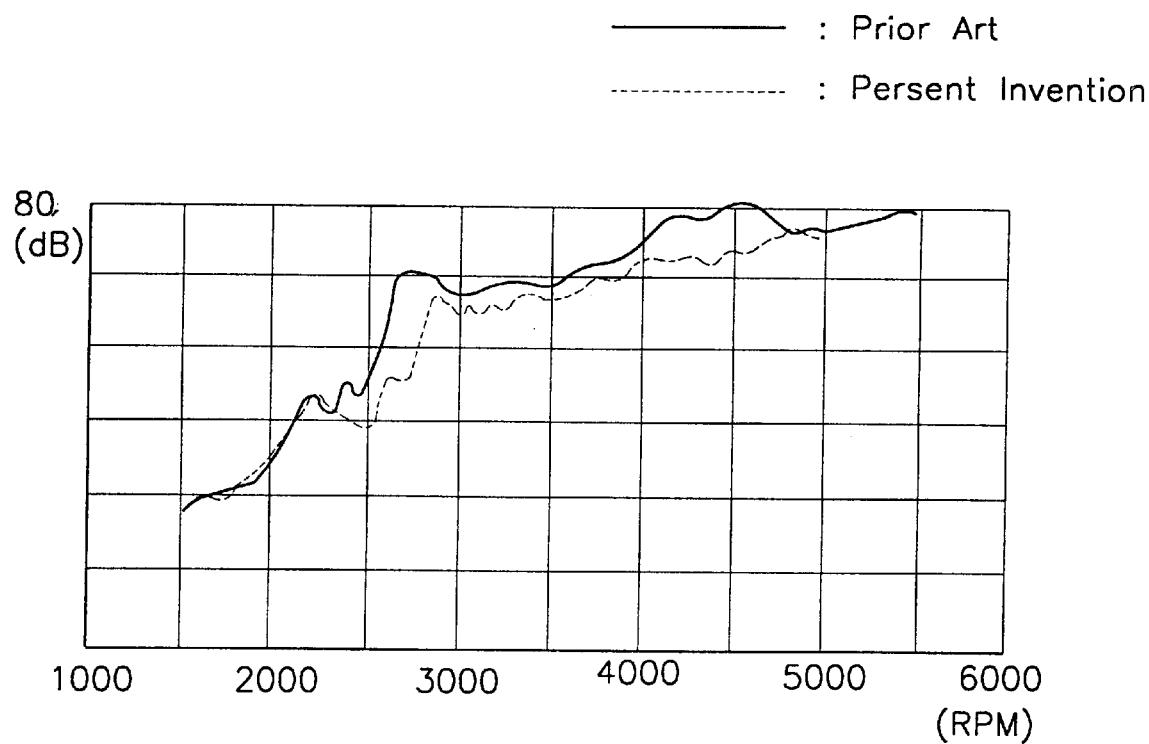
FIG. 8 is a graph comparably showing the noise levels in a rear seat of a vehicle for a power plant versus engine RPM when the engine employs the conventional mount assembly and when the engine employs the mount assembly of the present invention.
Figure 9:
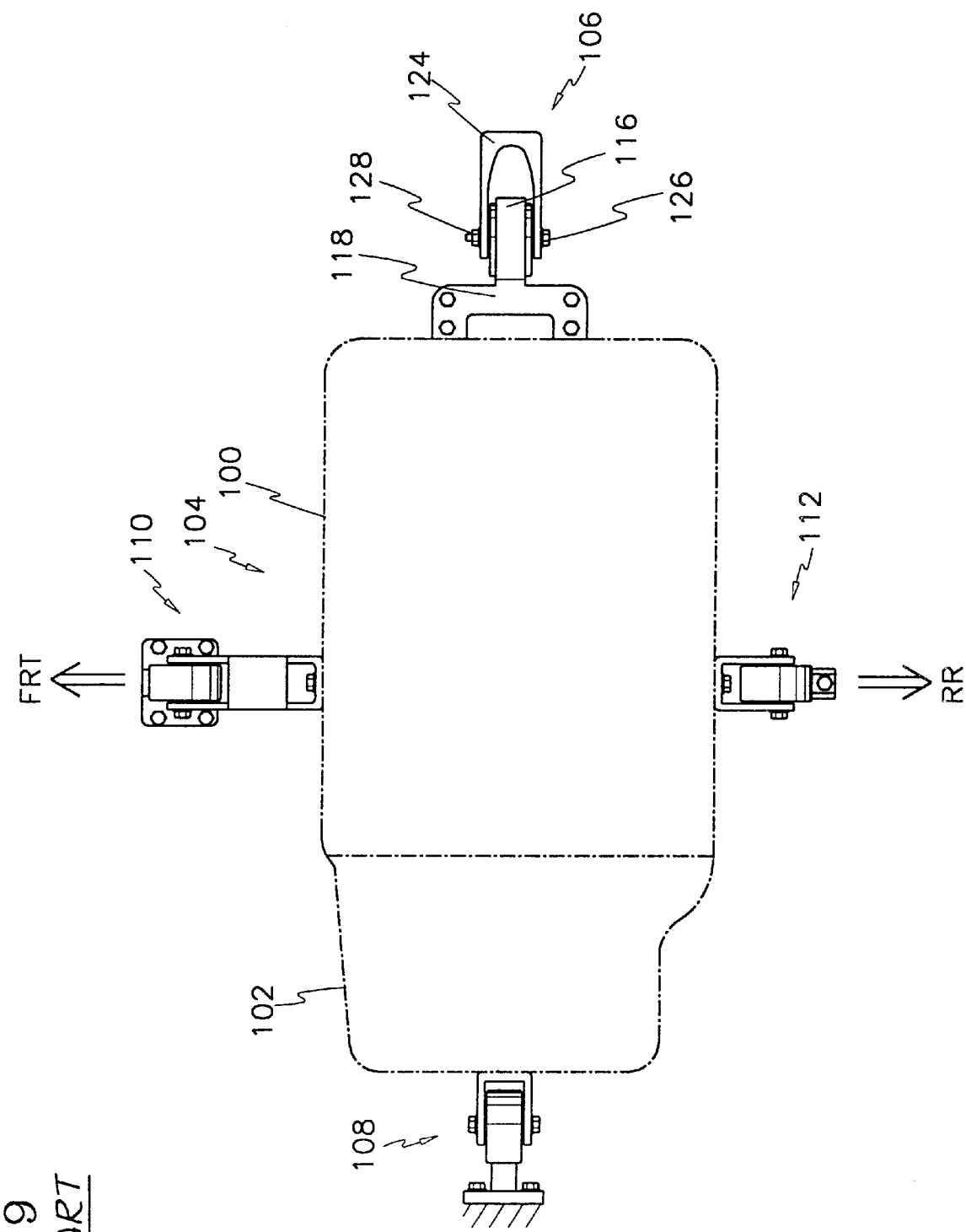
FIG. 9 is a top plane view showing conventional mount assemblies adapted for mounting a power plant.

FIGS. 7 and 8 are graphs showing a comparison of noise levels in the front seat compartment and in the rear seat compartment when respectively employing the mount of the present invention and the mount of the prior art.

As shown in FIGS. 7 and 8, when the mount of the present invention was applied, the noise reduction efficiency was also generally improved.

As described above, since the axis of the mount of the present invention is parallel to the inertial axis of the moment of inertia of the power plant and the mount is designed such that the stiffness of the elastic member of the mount is less in the front and rear directions than in the upward and downward directions of the vehicle, the mount can effectively prevent rocking of the power plant especially when the vehicle is abruptly accelerated or decelerated as well as prevent the engine vibration and noise from being transmitted to the passenger compartment, resulting in enhancing the ride comfort of the vehicle.

While this invention has been described in connection with what is presently considered to be the most practical and preferred embodiment, it is to be understood that the invention is not limited to the disclosed embodiments. On the contrary, this invention is intended to cover various modifications and equivalent arrangements included within the spirit and scope of the appended claims.

What is claimed is:

1. A power plant mounting structure for a vehicle including an engine-side mount assembly, a transmission-side mount assembly, and front and rear mount assemblies, wherein the engine-side mount assembly comprises;

a mount which is less stiff in front and rear directions than in upward and downward directions of the vehicle, and wherein the mount is arranged such that an axis of the mount is parallel to an inertial axis of a moment of inertia of the power plant;

a linkage member for connecting the mount to an engine-side of the power plant by coupling a screw member coaxially fixed at the center of the mount with a screw block fixed to the engine-side of the power plant;

a mounting bracket for fixing the mount to a side member of the vehicle body; and means for enhancing rigidity of the mount assembly in left and right directions of the vehicle relative to a longitudinal axis of the vehicle, wherein the enhancing means is formed by bending the longer edges of a steel strip, and one end of the enhancing means is fixed on a top portion of the mount and another end of the enhancing means is fixed to an apron panel of the vehicle body.

2. A power plant mounting structure of claim 1 wherein the mount comprises a cylindrical outer member and an elastic member filling the inner space of the cylindrical outer member wherein the elastic member has a crevice that separates the elastic member into upper and lower parts.

3. A power plant mounting structure of claim 1 wherein the mounting bracket comprises a fixing part for fixing the mounting bracket to a side member of a vehicle body and a pair of vertical supports both having a concave curvature part on which the mount is loaded and fixed.

* * * * *